United States Patent [19]

Mann

[11] Patent Number: 5,257,747
[45] Date of Patent: Nov. 2, 1993

[54] UNIDIRECTIONAL SHORT TAPE ENDLESS LOOP CASSETTE

[76] Inventor: Donald V. Mann, P.O. Box 422093, San Francisco, Calif. 94142-2093

[21] Appl. No.: 814,446

[22] Filed: Dec. 30, 1991

[51] Int. Cl.⁵ .................. B65H 23/00; G11B 23/07
[52] U.S. Cl. .......................... 242/55.19 A; 360/132
[58] Field of Search .............. 242/55.19 A, 55.19 R, 242/199; 360/132

[56] References Cited

U.S. PATENT DOCUMENTS

| | | | |
|---|---|---|---|
| 3,938,752 | 2/1976 | Mann et al. | 242/55.19 A |
| 4,943,878 | 7/1990 | Lin | 360/132 |

Primary Examiner—Daniel P. Stodola
Assistant Examiner—John Q. Nguyen
Attorney, Agent, or Firm—Joseph L. Strabala

[57] ABSTRACT

In a cassette for a standard tape player including a platen having an inverted conical hub mounted on the platen to freely rotate about one of the sprocket drive apertures of the cassette with an endless spool of magnetic tape coiled on the hub and platen and having an operating tape loop extending from the spool, the improvement comprising a guide arranged adjacent to one of the capstan drive apertures operable to route the operating tape loop threaded in the cassette to by-pass one of the capstan drive aperture so that placing the cassette in a machine in one orientation will allow one of the capstan drives to transport the operating tape loop, while reversing the orientation of the cassette will not allow a capstan drive to transport the operating tape loop in the cassette in the opposite direction. Also the novel cassette is suitable for use in auto reversing tape players. In the preferred embodiment the guide includes a roller member is arranged on a pivoted arm so that the operating tape loop of the magnetic tape can be positioned to by-pass a capstan aperture in one of the positions of the roller member and not to by-pass this aperture in the other position, thereby allowing the erase functions of a standard cassette player to be employed by the user when desired.

4 Claims, 7 Drawing Sheets

UNIDIRECTIONAL SHORT TAPE ENDLESS LOOP CASSETTE

BACKGROUND

Applicant successfully developed an endless loop cassette and obtained a U. S. Patent on his development, U. S. Letters Pat. No. 3,938,752. This patent issued in 1976. The patented cassette employed a platen having an inverted conical hub mounted on the top thereon which is joined to turn with the platen on which a spool of an endless loop of magnetic tape was placed. This arrangement allows an operating loop of the magnetic tape to be pulled from a point contiguous to the top of the hub to rotate it without binding which binding would ordinarily prevent the transport of an operating tape spool without some type of auxiliary drive for the rotating this assembly as taught in the aforementioned patent.

Applicant has now developed an improved cassette which may be referred to a short or single song cassette employing an endless loop of magnetic tape for Sony Walkman ® players, and like devices. Typically the novel cassette employs 200 feet of less of magnetic tape in the spool on the platen. It is designed to avoid damage to the operating tape loop which will likely result if the loop is transported in the wrong or the undesired direction thereby preventing the spool from rewinding on the platen.

The objective is achieved by special guide means arranged to route the operating tape loop from the endless magnetic tape spool mounted on a platen with the conical hub so the loop will by-pass one of the capstan drive apertures in the novel cassette in which a capstan drive could transport the loop in the wrong direction. It is also a feature of the guide means the align the operating loop between the top and bottom halves of the cassette s it will properly engage the play head of a cassette recorder in which the cassette is used. Preferably the guide means includes a roller member arranged to allow the operating tape loop to pass behind one of the capstan drive apertures and around the roller member to reduce the frictional drag. This arrangement facilitates the transport of longer spools of endless magnetic tape in the novel cassette. The frictional loads are reduced sufficiently with the roller member to prevent binding of the operating tape loop as it exits from the top of the hub, rotating the hub, platen and spool of tape which otherwise might prevent smooth transport of the tape.

In a preferred embodiment, the roller member is mounted on a pivoted arm which allows the roller member to be repositioned in the novel cassette so the operating tape loop can be erased by the normally by-passed erase head when desired by the user. This feature is accomplished by using a two-position arm to reposition the roller member from a first position which by-passes one of the capstan drive apertures to a second position which does not allow the tape to by-pass this capstan aperture so the erase head can engage the operating tape loop threaded across the inside front edge of the cassette.

SUMMARY OF THE INVENTION

A unidirectional short tape endless loop cassette incorporating a standard cassette exterior configuration having a having top half and a bottom half joined together with spaced apart central sprocket apertures therein and also having a plurality of conventional tape access windows along its front edge for access to magnetic tape contained therein and two capstan drive apertures for receiving the capstan drive spindles of a cassette player plus two apertures for receiving aligning pins of a cassette player, the improvement of providing at least one central aperture with an inward extending hollow cylindrical boss formed about the periphery of the aperture, mounting a flat platen having an inverted conical hub fixed thereto for free rotation on the boss with an endless spool of magnetic tape coiled on the platen, the spool having an operating tape loop exiting from said hub and returning to the outer most coil of spool on the platen, and guides means for routing the operating tape loop from the spool across the front edge of the cassette just inside the tape access windows so that the operating tape by-passes one of the capstan drive apertures when the cassette is inserted in a standard cassette player. The guide means preferably a roller member located adjacent to a capstan drive aperture which operable to route the operating tape loop of the magnetic tape spool on it so this loop will by-pass the adjacent capstan drive aperture with minimal frictional drag. It is also desirable that the roller member be mounted on an pivoted arm, which is pivoted in the novel cassette so it has two positions. This arm is operable in one position to route the operating tape loop of the magnetic tape on it so the tape loop by-passes the adjacent capstan drive aperture and is operable in the other position to route the operating tape loop so it does not by-pass this capstan drive aperture. An auxiliary arm can be mounted on this arm which includes a panel or cover that blocks one of the apertures for the aligning pins in the novel cassette. This flap protects against improper insertion of the cassette in a configuration where in the operating tape loop does not by-pass the capstan drive aperture when is desired to use the erase head of the a cassette player.

BRIEF DESCRIPTION OF THE DRAWINGS

The invention of the applicant will be understood by reference to the accompanying drawings, in cooperation with the accompanying description, wherein.

DESCRIPTION OF A PREFERRED EMBODIMENT

Figure 1:
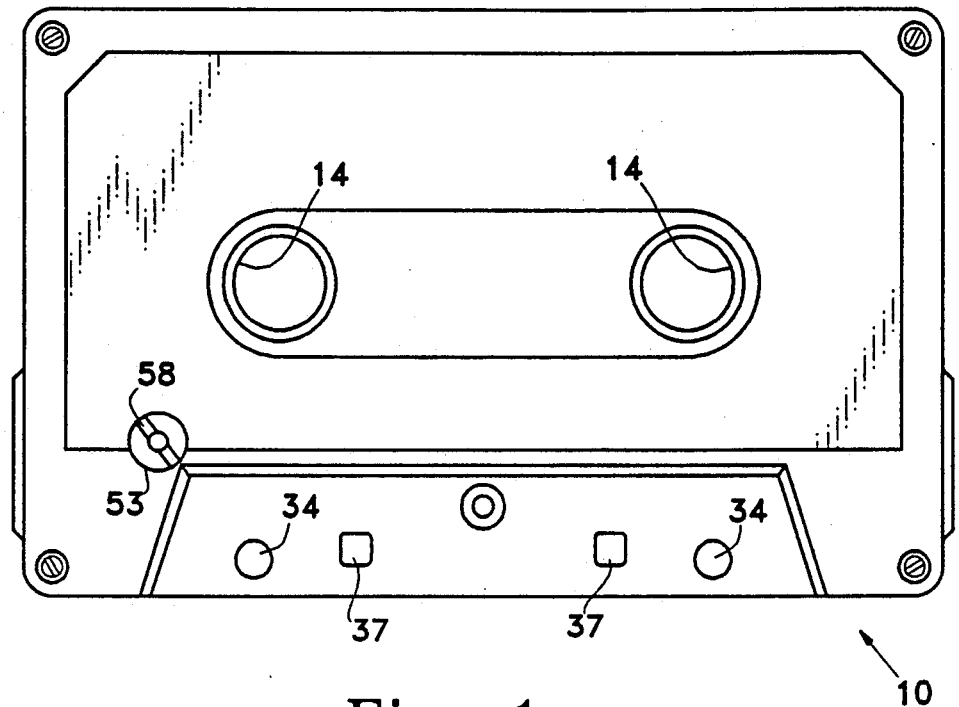
FIG. 1 is a plan of the cassette modified with the extending loop of magnetic tape routed in the cassette on guides means according to this invention so the operating tape loop by-passes one of the capstan drive apertures.

Referring to FIG. 1 it can be seen that the invention employs a cassette 10 with a standard exterior and conventional front edge tape accesses windows. It includes a split housing, which is composed of a top half 11 and a bottom half 12 Since this invention employs a short endless spool of magnetic tape (approximately 200 feet or less) it is not necessary to use the auxiliary drives employed with the standard cassettes. Normally drive sprockets are received in the two spaced, central sprocket apertures 14 of the housing to assist the transport of the tape in a conventional cassette. Thus, in this invention, these sprocket apertures, where the drive sprockets of the standard cassette player are received, are each enclosed with hollow cylindrical boss 15 which will allow the drive sprockets of the player to idle in these apertures when this novel cassette is inserted in a standard cassette player (not shown). If resistance on the drive sprockets is desired to facilitate the operation of the cassette player the sprocket apertures can be equipped with a stationary ring having inwardly directed fingers (not shown) that are flexible to produce drag on the several sprockets discussed.

Figure 5:
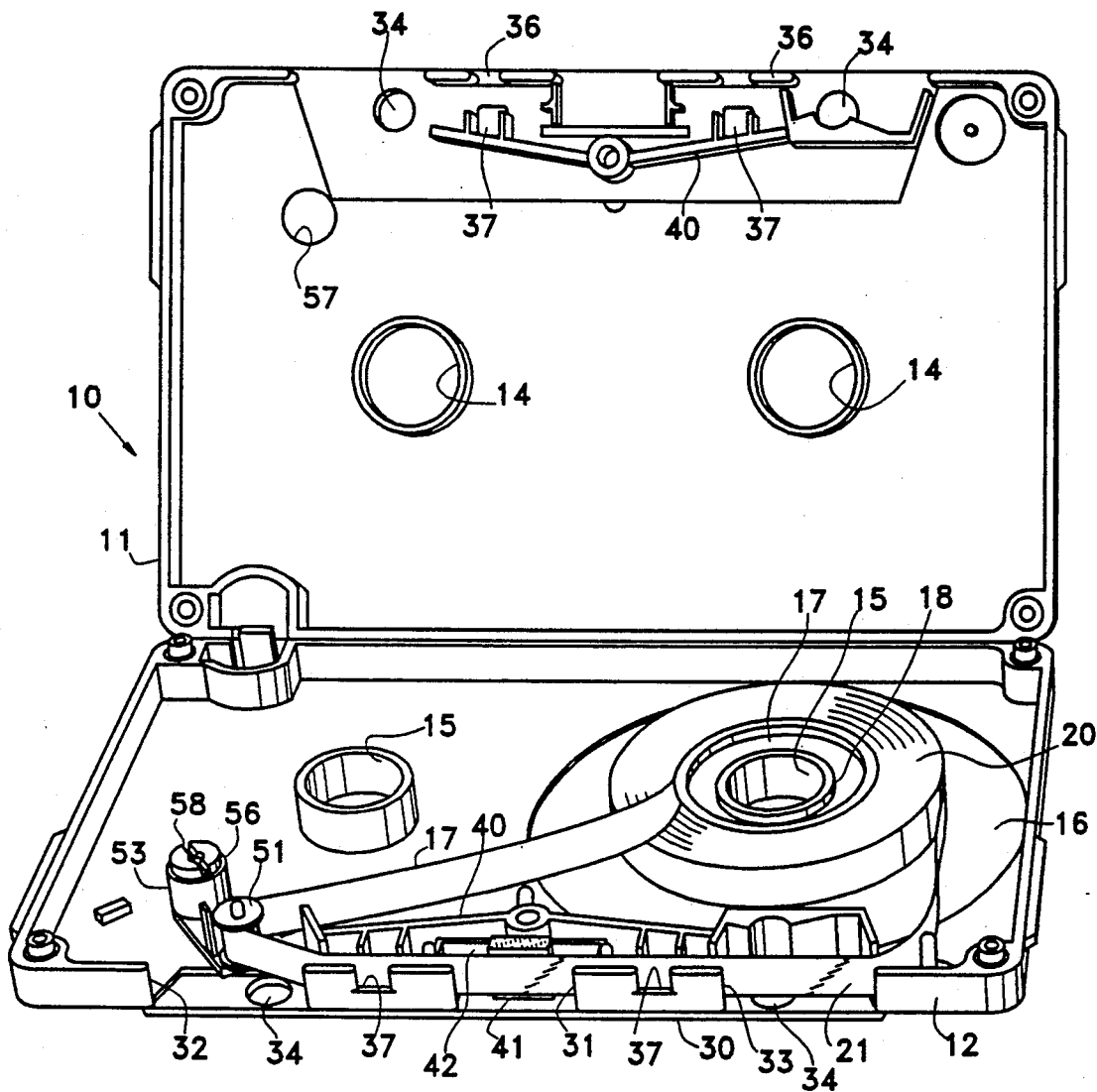
FIG. 5 is a perspective of the novel invention showing the cassette illustrated in FIG. 1, with its top half opened in a clamshell fashion relative to its lower half, to illustrate how the operating tape loop from the endless spool of magnetic tape on the platen is routed therein on guides means (here a roller) mounted on a pivoted arm in a position which by-passes one of the capstan drive apertures.

In FIG. 5 it can be seen one of the hollow bosses 15 serves as the bearing boss for the platen 16, which as illustrated is a flat disk, and its associated inverted conical hub 17 so that the center bore 18 of this combined member can be mounted on one of the bosses so the platen and hub will be free to rotate thereon with minimal frictional drag. The hub is fixedly joined to the platen so these parts rotate in unison as described in U.S. Pat. No. 3,938,752 whereby the endless spool 20 of magnetic tape on the platen will be carried by the platen as it rotates.

Figure 6:
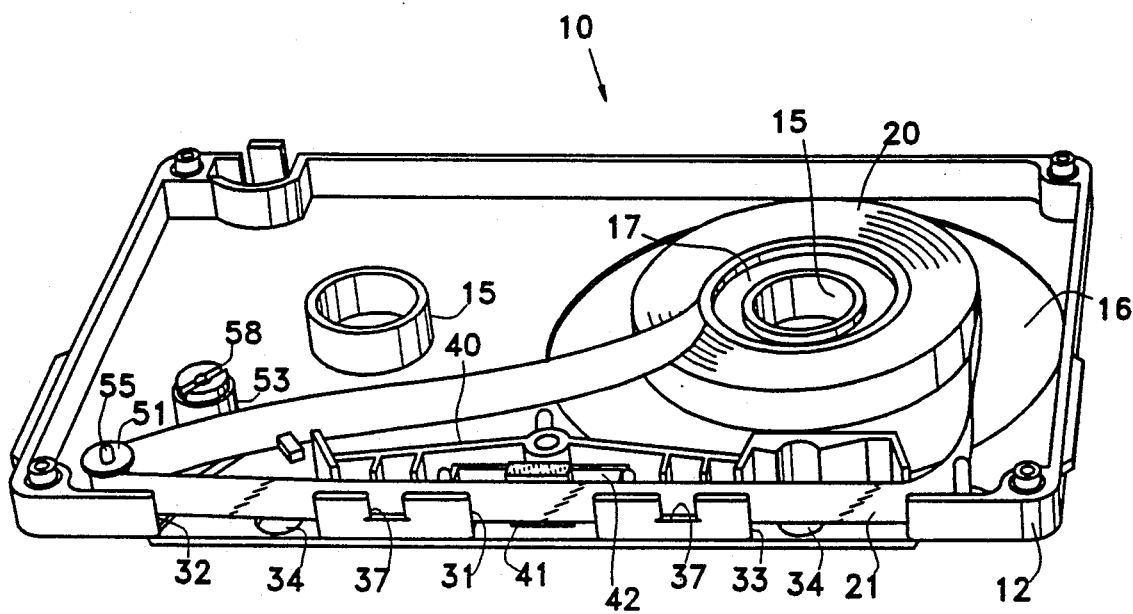
FIG. 6 is a perspective of the lower half of the novel cassette illustrated in FIG. 5, showing the arm repositioned so the operating tape loop will not by-pass the adjacent capstan drive aperture.

The above arrangement and conical shape of the hub 17 prevents the tape 20 coiled on the platen 16 from tightening on the hub 17. This conical shape also allows the operating tape loop 21, extending from the top of the hub, to drive or rotate the platen as it is pulled from the top edge of the hub as shown in FIGS. 5 and 6. As the platen assembly rotates it will rewind the operating tape loop on the outer periphery of the tape spool 20 coiled on the platen.

The tape spool 20 is loosely coiled on the platen and since this endless tape spool has a fixed length, it can be appreciated by the pulling the tape from the top the conical hub 17, thereby causing the platen assembly to rotate, this will insure that all the tape in the operating loop extending from the spool will be rewound on the platen because the outer periphery of the tape spool on the platen has a greater diameter than the conical hub (see FIGS. 5 and 6 showing this relationship).

Figure 2:
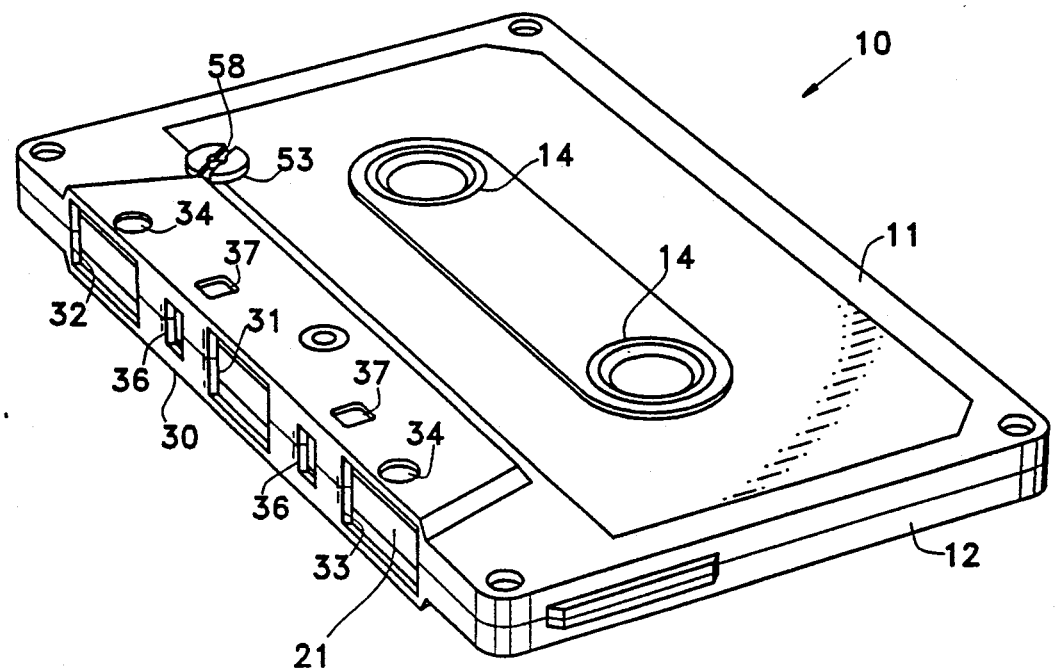
FIG. 2 is a perspective showing the novel cassette, shown in FIG. 1, illustrating the several tape access windows along the front of the novel cassette.

By the guide means the operating tape loop 21 from the platen assembly is routed in the modified cassette as shown in FIGS. 5 and 6. Before discussing the internal modifications to the top half 11 and the bottom or lower half 12 of the cassette 10, a description of the exterior to the housing 10 is in order. In FIG. 2, a perspective of the housing, it can be seen that its front 30 is conventional and includes three spaced apart tape access windows, being a central play head window 31, flanked by capstan windows 32 and 33 respectively, on its opposite sides. Each capstan window has a capstan drive aperture or bore 34 associated therewith which extends from the top of the housing through bottom of the housing. Each of the capstan apertures is set back a short distance from the front edge 35 of the cassette, as can be seen in FIG. 2. This setback, which is conventional, allows the operating tape loop, in a conventional cassette wherein the operating loop connects two separate spools of tape on opposite sides of the cassette, to be threaded along a channel inside the front edge of the cassette so a capstan drive spindle of a cassette player (not shown) is received behind the tape when the cassette is placed into a cassette player (not shown). Under normal circumstances when a cassette is received into a cassette or tape player an elastomer pinch roller (not shown) enters the capstan window having the capstan drive spindle (not shown) and pinches the tape against this cylindrical spindle so the operating tape loop will be transported across the play head of the cassette player.

Between the central play head window 31 and each capstan window 32 and 33 in the front of the novel cassette, is a small access window 36, and behind each is a guide pin aperture 37 which extends through the housing 10 from the top to bottom. Each guide pin aperture is also set back from the front edge 35 of the housing, as can be seen in FIG. 2. In most players guide pins are provided to orientate the cassette in the cassette player so the play head which enters the play window will be properly positioned; these guide pins of the player (not shown) are received in guide pin apertures 37. However not all cassette players use two such guide pins.

One of the problems addressed with this invention is that many reversing cassette players have dual capstans and use separate pinch rollers on opposite side of the play head window to alternately pinch the tape against one capstan spindle for transport in one direction and then against the other capstan spindle to transport the tape in the opposite direction. Such units are often referred to as auto-reversing player. In endless loop cassettes of the type described herein, any reverse transport of the magnetic tape will destroy the cassette as the tape loop will be pulled from the outer periphery of the tape spool (see e.g. FIG. 5) which tighten the coils of tape against the hub while twisting the tape where it exits from the hub 17 as the tape cannot rewind on the tape spool 20.

Figure 3:
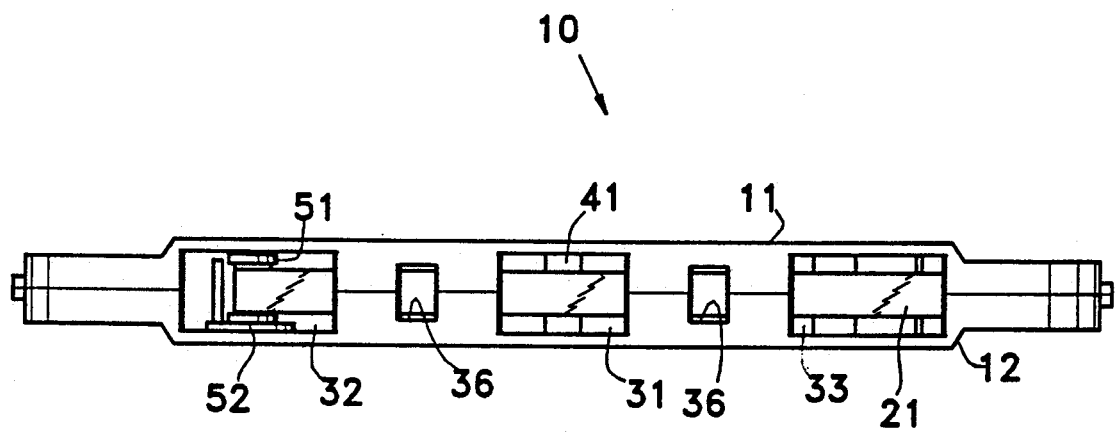
FIG. 3 is an elevation of an embodiment of the invention showing the front edge or face of the novel cassette with conventional tape access windows illustrating where the roller member is mounted so the operating tape loop by-passes one of the capstan drive apertures.

As indicated, top and bottom halves of the housing 10 contain an internal wall structure spaced inwardly from the front edge 35. As the top half is similarly configured, the same modifications to the lower half 12 described herein are also accomplished on the upper half 11 and need not be discussed. This wall forms a channel between it and the front of the cassette for routing the tape through the cassette. As can be seen in FIG. 5 this wall structure or web 40 is positioned a short distance behind the windows 31, 32 and 33 along the front 30 of the housing so that the operating tape loop 21 can be routed between the wall and the windows 31, 32 and 33, as previously described. This wall is parallel to the plane of the windows but set back therefrom and typically supports extending tape loop 21 in a manner so it is centered between the top half and bottom half of the cassette in the several windows, as shown in FIG. 3.

The wall 40 also supports a pad 41 mounted on a leaf spring 42 which has its ends supported in slots in the wall. This pad, located between the ends of the spring, urges a portion of the operating tape loop 21 in the play window 31 against the play head when the cassette is inserted into a cassette player and the play head is moved into this window. Normally the operating tape loop is also supported by slots 43 in the wall where its webs joins the front edge of the cassette at the out board edges of the capstan drive windows 32 and 33 respectively. Centering slots 44 adjacent to each of the small access windows 36 can also be used for this purpose.

As can be seen in FIGS. 5, 6, 7 and 8 the wall or web 40 is modified by removing a portion of it behind one of the capstan windows, in this case capstan window 31. At the end of this capstan window adjacent to the access window 36 the wall is removed and replaced by a roller member 51 which is mounted on a spindle 55 as shown in FIG. 5. Enough of the wall is removed so the operating tape loop 21 can pass around the roller member and then be threaded through the play window 31, as illustrated in FIG. 5.

Figure 7:
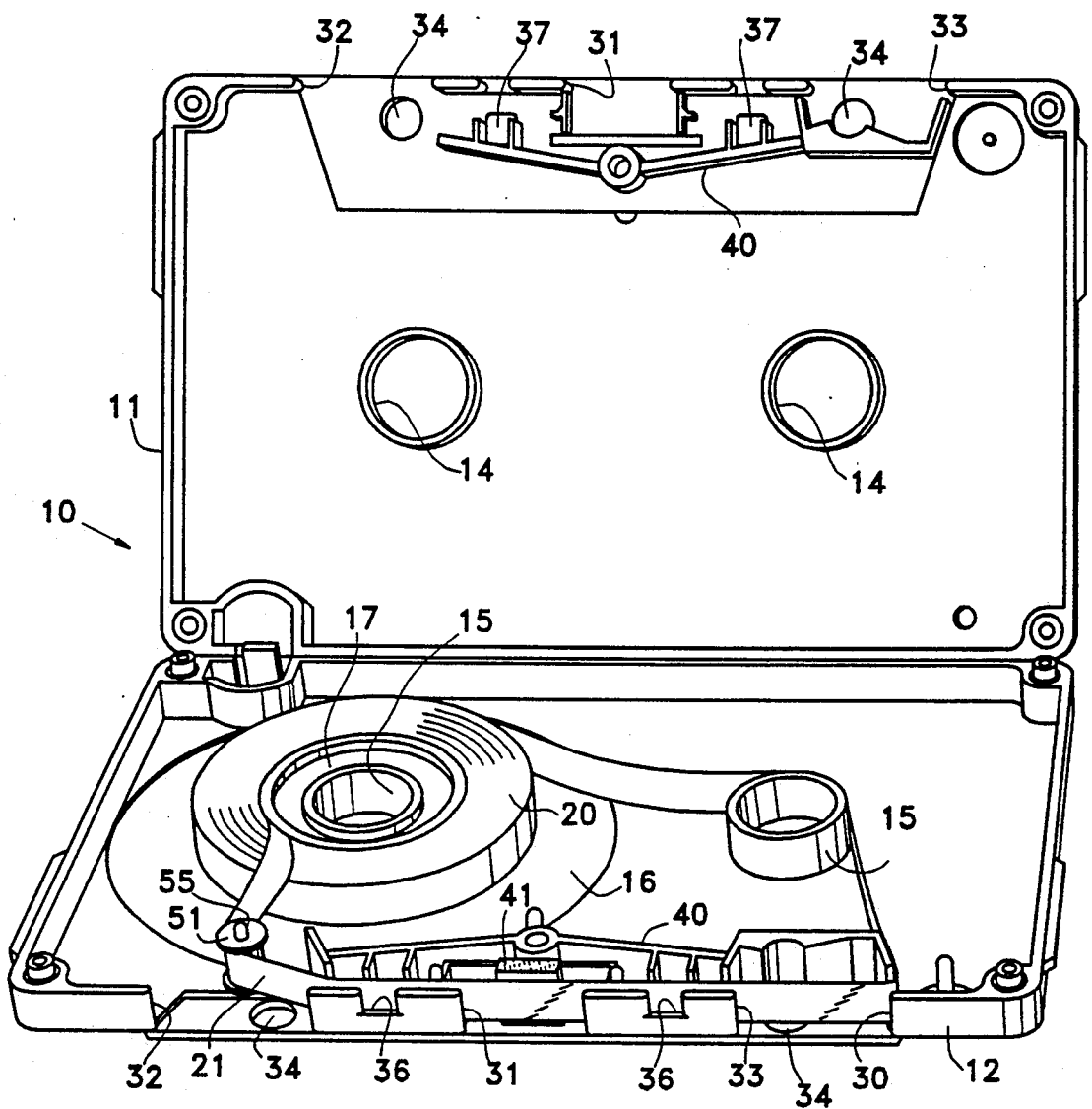
FIG. 7 is a perspective of the novel cassette similar to the one shown in FIG. 5 illustrating an alternate routing arrangement for the operating tape loop from spool thereof mounted on the platen and an alternate positioning of this platen in the cassette.

With this modification the operating tape loop 21 is routed from the top of the hub 17 to the roller member 51 whereafter it is then routed through the play head window 31 and then through the capstan window 33 after which this loop returns the interior of the housing 10 to outermost coil of the spool 20 on the platen 16 as can been seen in FIGS. 5, 6, and 7. The guide means formed by the roller member can also be constructed so it aligns the operating loop between the top and bottom halves of the cassette. This can be accomplished by radial extending flanges at the top and bottom of the roller member. With extremely short endless tapes, well under 200 feet, the spindle 55 or a slot in the wall 40 may provide adequate guide means to accomplish the objectives of this invention.

In a preferred embodiment, shown in FIGS. 5 and 6, the spindle 55 of the roller member 51 is mounted on an arm 52 pivoted behind the window 32 on a pivot 53. The length of the arm is such that the roller member can be swung from the position shown in FIG. 5 to the position shown in FIG. 6.

Figure 4:
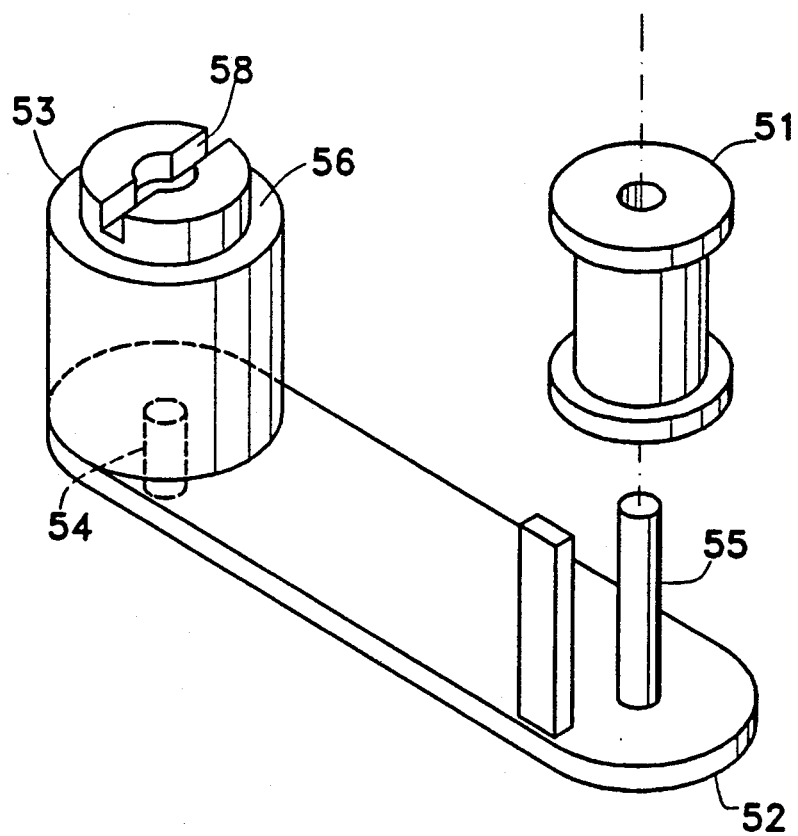
FIG. 4 is an exploded perspective of the pivoted arm of the preferred embodiment of the invention wherein the configuration of the pivoted arm is shown with greater detail.

Pivot 53 is illustrated in exploded detail in FIG. 4 and it can be seen that it has a projecting pin 54 at its bottom end where its arm 52 is joined to the pivot. This pin is received in an aperture formed in the bottom half 12 of the housing 10. The top of the pivot has a reduced diameter so that a shoulder 56 is formed at its top. The top half 11 of the cassette has an aperture 57 with a diameter slightly larger than the top of the pivot so when the pivot is installed between the two halves of the housing the pivot is retained between inside surfaces of the housing halves 11 and 12 shown in FIG. 2. The top of the pivot includes a slot 58 and since the arm is fixed to the pivot, using a coin or screw driver, the pivot can be turned to position the roller member 51 in either one of its two positions, shown respectively in FIGS. 5 and 6.

In FIG. 7 an alternate embodiment of the invention is illustrated wherein the platen 16 is moved from the right side of the housing 10 to the left side. In this embodiment a pivoted arm is not used and the spindle 55a for the roller member 51a is mounted directly on the bottom half 12 of the housing, as shown. Because the distance between the hub 17 and the roller member 51a is short the roller member includes radial extending flanges at its top and bottom ends to prevent the operating tape loop from becoming tangled. These flanges also provide auxiliary guide means for vertical alignment of the operating tape loop 21 and the free turning roller member reduces friction so the short distance with the several sharp changes of direction will not allow the operating tape loop to foul or to become skewed in the several tape access windows across the front of the novel cassette.

Figure 8:
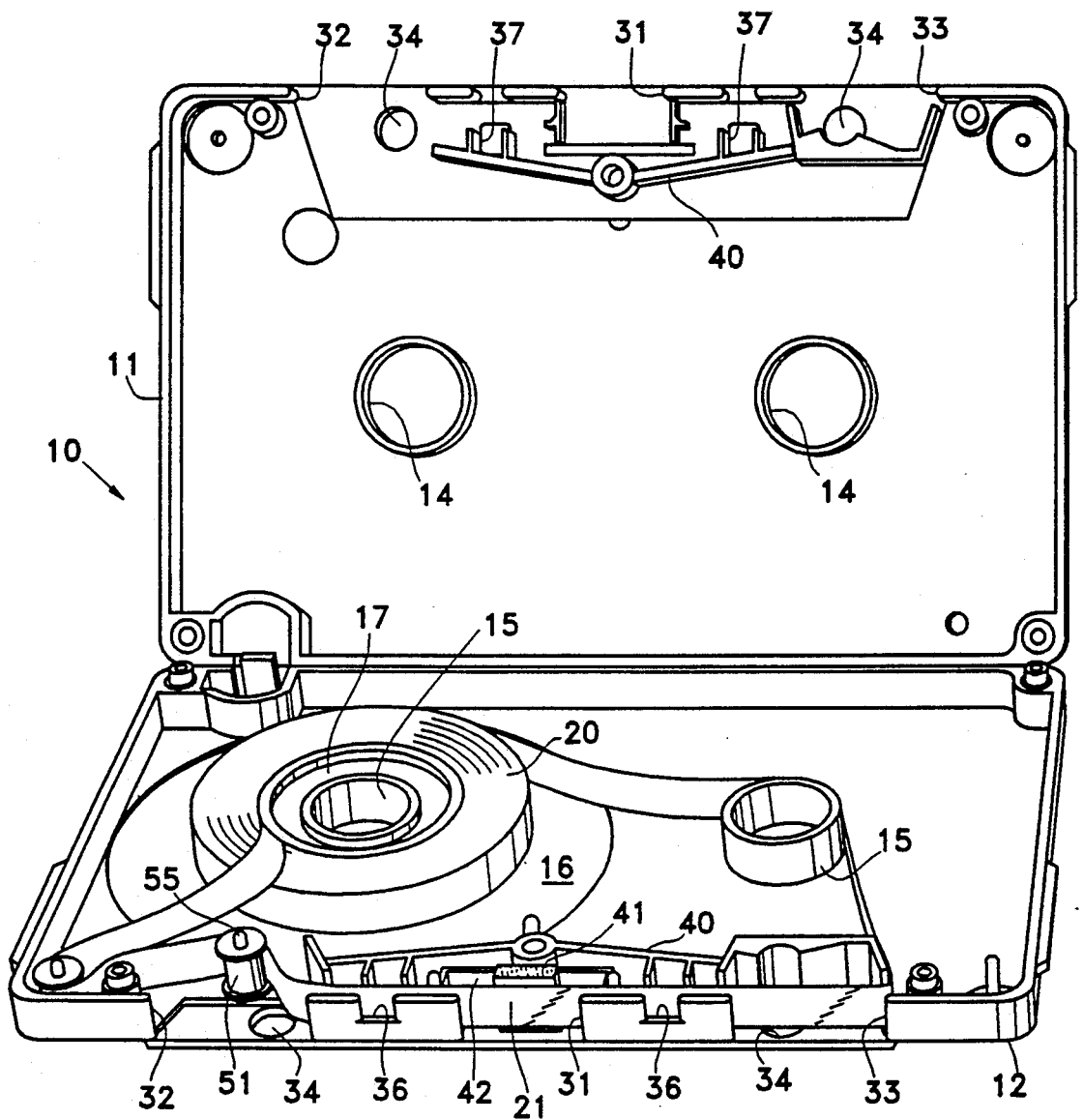
FIG. 8 is the same perspective of the novel cassette shown in FIG. 7 but with a third routing arrangement for the operating tape loop extending from the spool on the platen.

To avoid the problems discussed above, in reference to FIG. 7, an alternate routing of the operating tape loop can be effected, as shown in FIG. 8. In this embodiment the operating tape loop 21 after it exits the hub 17 is first taken to the corner of the cassette housing where it is threaded around a roller 60 and then is directed to roller member 51a and then passes into the channel between the front of the cassette and the several tape access windows as shown in FIG. 8. This routing arrangement may be desirable when using endless tape spools of about 200 feet.

Figure 9:
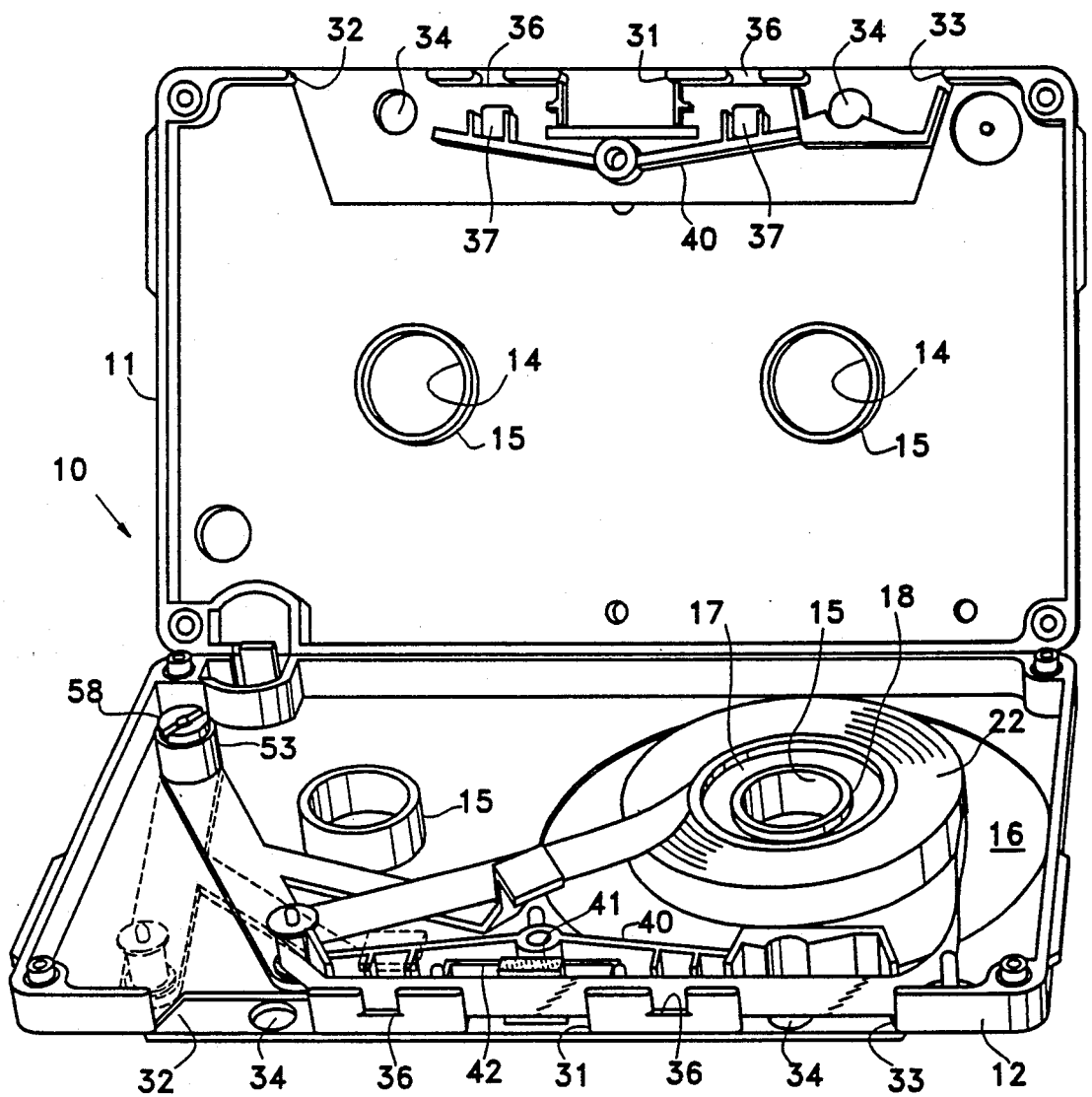
FIG. 9 is a perspective of another preferred embodiment wherein the pivoted arm shown in FIG. 4 is further modified with an auxiliary arm which includes a cover or plate which blocks one of the aligning pin apertures when the user is employing a configuration that could allow reverse transport of the operating tape loop extending from the spool thereby preventing any improper insertion of the cassette in a cassette tape player.

FIG. 9 shows a further modification of the novel cassette shown in FIGS. 5 and 6. In this embodiment the locations of the pivot 53 is moved toward the rear of the cassette housing 10 and the length of the arm 52 is extended to accommodate the assembly of the roller member 51 near the front 30 of the cassette housing. Arm 52 is provided with and auxiliary arm 61 which extends from its middle section in a "Y" type configuration, as shown. The end of this auxiliary arm is formed with an upward bend so an intermediate portion 62 connects it to its distal end 63 which is oriented parallel with the arm. This distal end forms a cover or flap which, when the arm is a position allowing reverse transport of the operating tape loop, as shown in FIG. 6, will block the one of the pin aligning holes 37 in the housing. This blocking configuration is shown by the broken lines in FIG. 9. As a result the novel cassette cannot be inserted into a cassette player in an orientation 180 degrees from the orientation shown in FIG. 9 because the cover or flap blocks the aperture for one of the aligning pins of the cassette player.

From the foregoing description of the invention it will be obvious that other modifications can be made without departing from the spirit of the invention.

Having described my invention, I claim:

1. A unidirectional short tape endless loop cassette, comprising:
   a standard sized cassette including a plurality of tape access windows along one edge forming the front for access to magnetic tape contained therein and two capstan drive apertures for receiving the capstan drives of a tape player plus two apertures for receiving aligning pins of a tape player, said cassette having a top half and a bottom half joined together and having two central, spaced apart sprocket apertures therein, one of said sprocket apertures having a hollow cylindrical boss formed about the periphery of said aperture and extending into said cassette;

a flat platen having an inverted conical hub fixed thereto journaled on said cylindrical boss for unrestricted rotation;

an endless spool of magnetic tape coiled on said platen having an operating tape loop exiting at said hub and returning to the outermost coil of said spool; and guide means in said cassette for routing said operating tape loop from said hub along said front of said cassette so that said operating tape loop by-passes one of said capstan drive apertures of said cassette to render said one capstan drive aperture inoperative.

2. The cassette defined in claim 1 wherein the guide means includes a freely rotating roller member located adjacent to one of the capstan drive aperture of said cassette and operable to route the operating tape loop of the spool of magnetic tape on it so said loop will by-pass said adjacent capstan drive aperture with minimum frictional drag.

3. The cassette defined in claim 2 wherein the free rotating roller member is mounted on an arm which is pivoted in said cassette to accommodate two positions, said arm in one position operable to route the operating tape loop on said roller member so said tape loop by-passes the adjacent capstan drive aperture and in the other position operable to route said tape loop so it does not by-pass said capstan drive aperture.

4. The cassette as defined in claim 3 wherein the arm includes secondary arm with a panel thereon, said panel operable to cover one of the pin aligning apertures in said cassette when said arm is in the position which does not allow the operating tape loop to by-pass the capstan drive aperture thereby preventing said cassette from being inserted improperly in a cassette player which could transport said tape loop in the wrong direction.

* * * * *